United States Patent [19]

Cooper

[11] Patent Number: 4,778,159
[45] Date of Patent: Oct. 18, 1988

[54] ADJUSTABLE RANGE SPRING FOR DIFFERENTIAL PRESSURE RESPONSIVE DEVICES

[75] Inventor: William J. Cooper, Los Angeles, Calif.

[73] Assignee: ITT Corporation, New York, N.Y.

[21] Appl. No.: 12,756

[22] Filed: Feb. 9, 1987

[51] Int. Cl.⁴ ............................ F16F 3/07; F16F 1/00; G01L 9/04; G01L 13/02

[52] U.S. Cl. ........................................ 267/151; 267/86; 267/272; 73/716; 73/720

[58] Field of Search .................... 73/716, 720; 267/80, 267/85, 86, 156, 88, 4, 259, 272, 290, 151, 28

[56] References Cited

U.S. PATENT DOCUMENTS

| 2,945,510 | 7/1960 | Jones | 73/716 X |
| 3,422,680 | 1/1969 | Nolte | 73/716 |
| 3,926,055 | 12/1975 | Garnett | 73/720 |

*Primary Examiner*—Andres Kashnikow
*Assistant Examiner*—Richard Potosnak
*Attorney, Agent, or Firm*—Menotti J. Lombardi

[57] ABSTRACT

A range spring assembly for a differential pressure responsive device which includes a spring retainer plate configured for coaction with a movable portion of a device, such as a bellows or diaphragm. A flat spiral spring in spaced relation to the retainer plate is provided with a clamp disc. A plurality of helical range springs are equiangularly disposed about a circumference inwardly of the periphery of the retainer plate, each of the range springs having a first end thereof securely attached to the retainer plate adjacent the center thereof, with the other ends being selectively attachable to the clamp disc, whereby the range may be readily established by locking one or more ends of the helical springs for providing the desired spring bias for the selected range.

9 Claims, 4 Drawing Sheets

ADJUSTABLE RANGE SPRING FOR DIFFERENTIAL PRESSURE RESPONSIVE DEVICES

BACKGROUND OF THE INVENTION

The background of the invention will be discussed in two parts.

1. Field of the Invention

This invention relates to differential pressure responsive devices, and more particularly to a spring assembly for differential pressure responsive devices which is readily adjustable to different spring tension ranges.

2. Description of the Prior Art

The use of more than one spring to accommodate varying loads has been employed in numerous applications, such as shock absorption on railroad cars or the like. In such applications, helical springs are employed, in nested or coaxial arrangement, with spring lengths within a nested arrangement varied to provide coaction of subsequent springs after certain loads are reached.

One such railroad vehicle suspension assembly is shown and described in U.S. Pat. No. 4,148,469, entitled "Dual Rate Spring with Elastic Spring Coupling", issued Apr. 10, 1979, to Geyer, which discloses a supportive spring system for accommodating variable loads of railway cars, the spring system utilizing a plurality of helical spring units comprising multiple nested springs with primary springs having greater axial length than one or more secondary springs so that the primary springs alone provide the initial load support, with the secondary springs becoming supportive under additional load, with all springs thereafter acting in unison.

Another spring device particularly adapted for use in a suspension system of a railroad car truck is shown and described in U.S. Pat. No. 4,186,914, entitled "Dual Rate Spring Device for Railroad Car Trucks", issued Feb. 5, 1980 to Radwill et al. The device includes a vertically mounted light duty spring means positioned between a side frame of the truck and a load carrying bolster of the truck to support the bolster when in a lightly loaded condition. Positioned around the light duty spring means is a shorter heavy duty spring which with the light duty spring supports the bolster when in a heavily loaded condition.

The use of nested helical springs of different lengths has also found application in other mechanical devices, such as compressors. One such structure is shown and described in U.S. Pat. No. 3,862,751, entitled "Dual Stage Compressor Spring", issued Jan. 28, 1975, to Schwaller, and discloses a dual stage energy absorbing spring assembly for use in compressors, the spring assemblies comprising two concentrically disposed, oppositely helical springs which are provided with buttons at top and bottom to provide bearing surface, with one spring being longer than the other such that as the assembly is compressed first one, then two springs resist compression, thus increasing spring rate when the second spring is engaged.

Another application of use of a variable spring tension arrangement is shown and described in U.S. Pat. No. 2,599,403, entitled "Automatic Spring Tension Varying Means", issued June 3, 1952, to D. Martin, and discloses a device for use in slot machines to alter the effective tension of the spinner-actuating spring element as an automatic reaction to play of the machine by use of a second spring acting in concert with a primary spring, with the second spring connected to an eccentric member which enables varying the force on play of the machine.

In electromechanical instrumentation and control devices, bellows and spring assemblies are employed to actuate levers or linkages to control dials or the like to provide a visual indication of a parameter, such as pressure. In flow or pressure instrumentation devices, in particular, to provide for different ranges within a given instrument, and to achieve accuracy within th range, normally a different spring assembly is incorporated in the instrument suitable to the range, thus requiring that different spring range subassemblies be available on the production line for the different ranges needed.

A typical bellows and spring arrangement in a differential pressure responsive device is shown and described in U.S. Pat. No. 4,445,382, entitled "Differential Pressure-Responsive Device", issued May 1, 1984, to Reynolds et al, such device including a bellows, the movement of which is responsive to pressure, with a helical range spring having one end thereof affixed to the bellows, with the other end being restrained by a plate member, the bellows and range spring being assembled as part of a readily removable module which also includes the high and low pressure relief valve assemblies.

Two patents which issued to C. B. Nolte disclose bellows and range spring structures similar to the Reynolds et al device. These devices are disclosed in U.S. Pat. No. 3,422,680, entitled "Differential Pressure-Responsive Device", issued Jan. 21, 1969, and U.S. Pat. No. 3,718,048, entitled "Relief Valves for Differential Pressure Flow Meters", issued Feb. 27, 1973. However, in the U.S. Pat. No. 3,422,680 Nolte patent, in lieu of imposing a positional restraint on the range spring at the end opposite the bellows, the device includes a dual spiral flat spring member, which engages the upper end of the range springs.

A variable spring assembly is disclosed in U.S. Pat. No. 4,112,960, entitled "Variable-Gradient Spring Sub-Assembly", issued Sept. 12, 1978 to Hermanns, the range spring sub-assembly having a helical spring whose lower end is secured to the pivoted feedback arm of the feedback assembly. The upper end is coupled by a span adjustment screw to a fixed arm thereof. The screw is coupled to a cylindrical coupling head which is provided with projections which engage the space between adjacent coils of the spring, with turning of the screw varying the position of the coupling head relative to the convolutions of the helical spring, thereby varying the number of active convolutions of the spring, to thereby vary the gradient of the spring.

U.S. Pat. No. 2,620,413, entitled "Control Device", issued Dec. 2, 1952, to B. L. Johnson, and discloses a control device in which a snap action switch is actuated in response to changes in variable condition and having two coaxially mounted springs in operative relation with the switch actuating lever, and wherein the tension of at least one of the springs may be adjusted by a thumbscrew in coaction therewith.

In accordance with an aspect of the invention, it is an object to provide a new and improved range spring assembly for differential pressure responsive devices, which assembly may be readily adjusted for different ranges.

SUMMARY OF THE INVENTION

The foregoing and other objects of the invention are accomplished by providing an range spring assembly which includes a spring retainer plate configured for coaction with a movable portion of a device, such as a bellows or diaphragm. A flat spiral spring is maintained in spaced relation to the retainer plate by stud spacers or the like adjacent the outer diameter of the retainer plate. A plurality of helical range springs are equiangularly disposed about a circumference inwardly of the periphery of the retainer plate, each of the range springs having a first end thereof securely attached, such as by welding to the retainer plate adjacent the center thereof. The spiral spring is provided with clamp means, such as a clamp disc secured to the centermost portion of the spiral spring, the clamp disc including a like plurality of projections having openings for receiving the other ends of each of the helical springs, with each projection having a threadably engaged cap lock screw positioned for extending into the opening for selectively clamping one or more of the ends of the helical springs. Upon assembly of the instrument, the range may be readily established by locking one or more ends of the helical springs for providing the desired spring bias for the selected range.

Other objects, features and advantages of the invention will become apparent from a reading of the specification, when taken in conjunction with the drawings, in which like reference numerals refer to like elements in the several views.

DESCRIPTION OF THE PREFERRED EMBODIMENT

Figure 1:
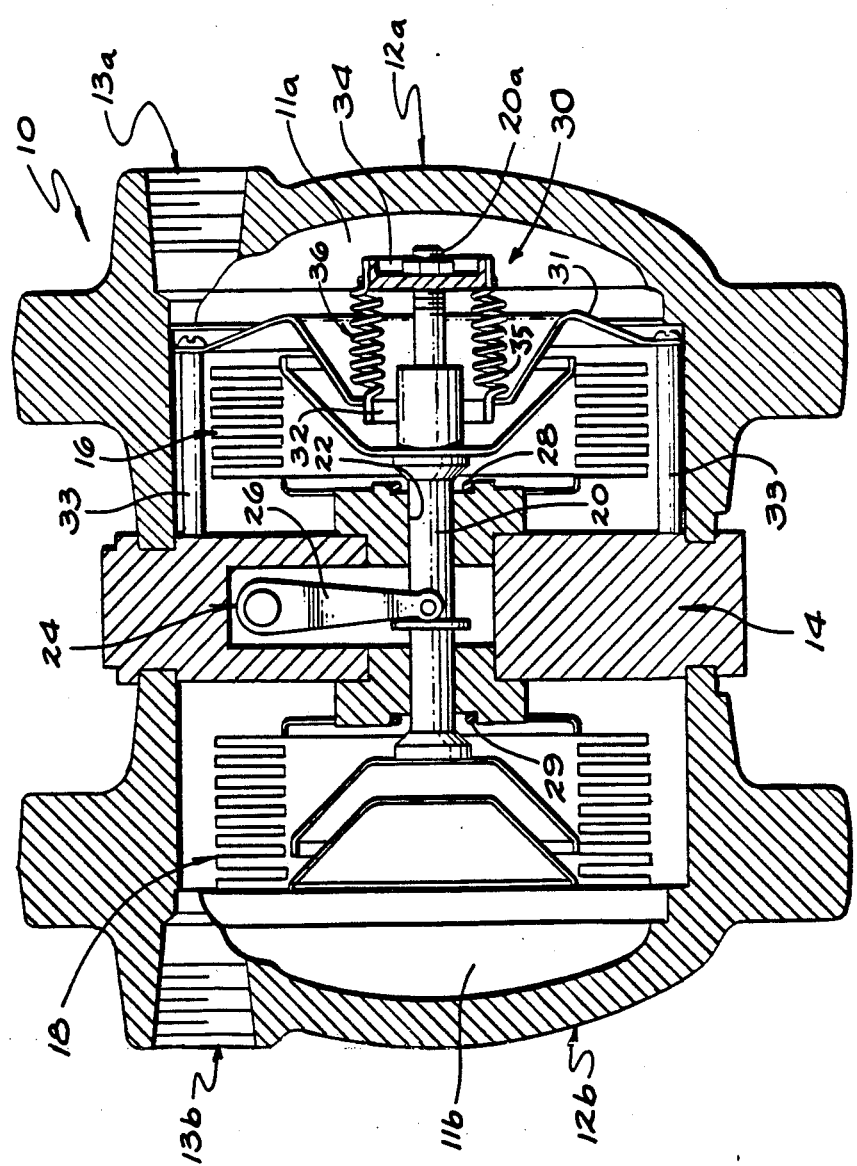
FIG. 1 is a cross-sectional view of a differential pressure responsive device incorporating a fixed differential range spring assembly.

Referring now to the drawings, and particularly Figure 1, there is shown a conventional differential pressure responsive device, generally designated 10, with a fixed differential range spring assembly, which device 10 includes a housing 12a,b formed to provide two chambers 11a and 11b, one of which is enclosed in the low pressure housing 12a, and the other enclosed in the high pressure housing 12b, the two housings being separated by a center plate assembly 14. A pair of liquid filled metallic bellows 16 and 18 are mounted to either side of the center plate assembly 14, and are connected together with an axially movable bellows connecting rod or valve stem 20 extending through a passage 22 within the center plate assembly 14. The chambers 11a and 11b within the low and high pressure housings 12a and 12b, respectively, are provided with ports, in the form of a low pressure connection 13a and a high pressure connection 13b, respectively, with bellows 16 within the low pressure side and bellows 18 within the high pressure side of the device 10.

Within the center plate assembly 14, a torque tube assembly 24 and drive arm 26 is mounted, with the free end of the drive arm 26 coupled to the valve stem 20 to pick-up the axial motion of the valve stem 20, which is then converted to a rotational output motion by way of the torque tube assembly 24 when a differential pressure is applied across the bellows 16 and 18. Suitable sealing means, such as O-rings 28 and 29 are provided about the periphery of stem 20 within passage 22 to seal the respective chambers.

With such devices 10, a fixed differential spring assembly 30 is normally employed to establish a pressure range of operation for the device 10. For a given housing or body size, and a given set of bellows 16 and 18, any one of a number of different such spring assemblies may be inserted into the particular device to establish the range of operation for the device. In such conventional devices, the fixed differential spring range assembly 10 is prefabricated, with each range requiring a different prefabricated assembly. By reference to FIG. 1, the range spring assembly is installed to the right of the low pressure bellows 16 within the chamber 11a of housing 12a, and exerts a bias which assists in restricting the axial movement of the valve stem 20.

As shown in FIG. 1, the fixed differential range spring assembly 30 includes a spring retainer plate 31 of circular configuration with the periphery thereof secured in fixed relation within the chamber 11a of housing 12a by suitable means such as standoffs 33 interposed between an interior wall of the chamber 11a and the periphery of the plate 31. The plate 31 includes a central hub shaped opening 32 through which the end 20a of valve stem 20 extends, the end 20a being secured to a spring retaining disc member 34 which has a peripheral flange. A pair (or more) of helical springs 35 and 36 have the first ends thereof secured, such as by welding or brazing to the hub of opening 32, with the other ends thereof likewise welded or brazed to the periphery of the disc member 34. The helical springs 35 and 36, in conjunction with the selected bellows 16 and 18 thus establish the range of operation for the device 10.

In accordance with the present invention, however, for a given size housing, and for a given set of bellows 16 and 18, an adjustable range spring assembly 40 is provided, in which one or more of a plurality of helical springs may be brought sequentially or selectively into play depending upon the spring bias desired in the completed assembly. Furthermore, the selection may be made at the time of initial assembly of the device 10, that is, during fabrication, or may be readily made in the field.

Figure 2:
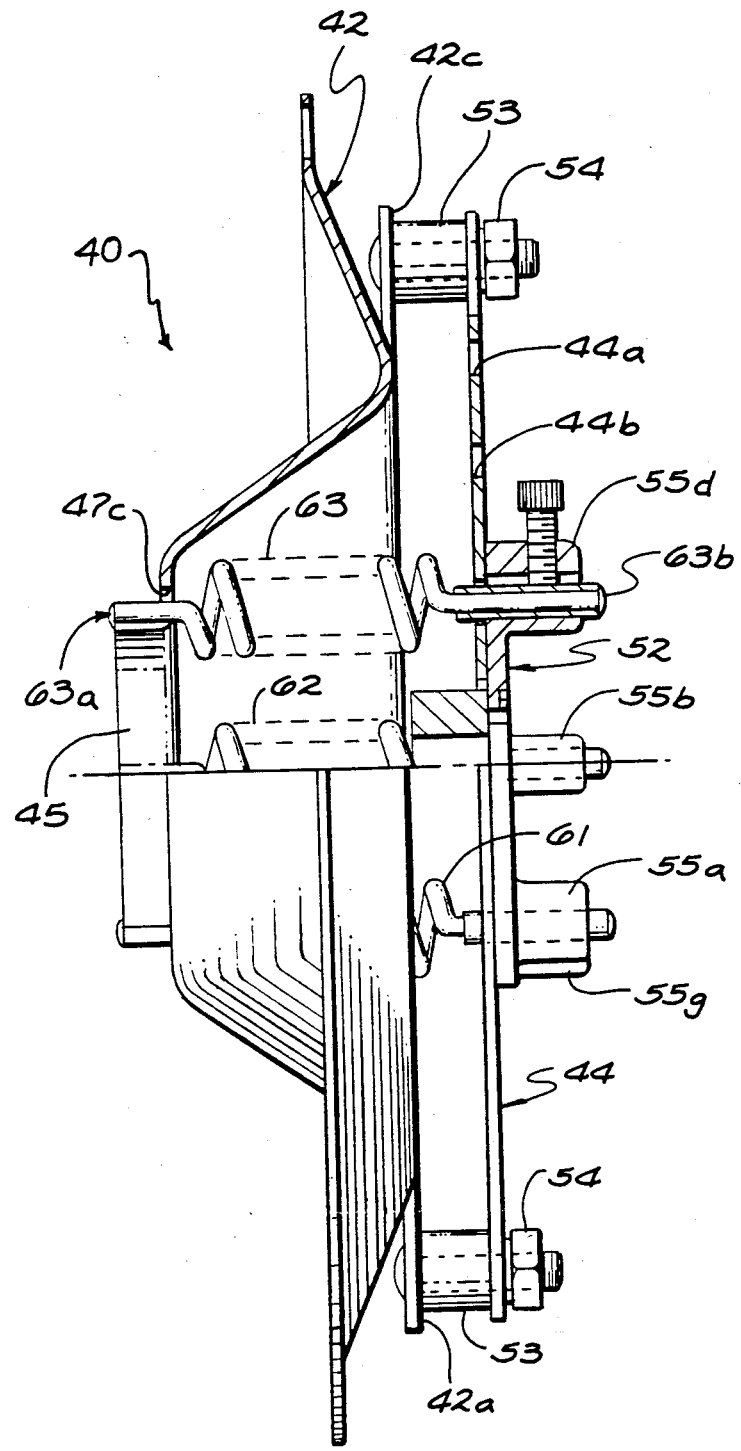
FIG. 2 is a side elevational view, partially in cross-section, of an adjustable range spring assembly according to the invention which may be interchanged with the fixed range spring assembly in the device of FIG. 1.
Figure 3:
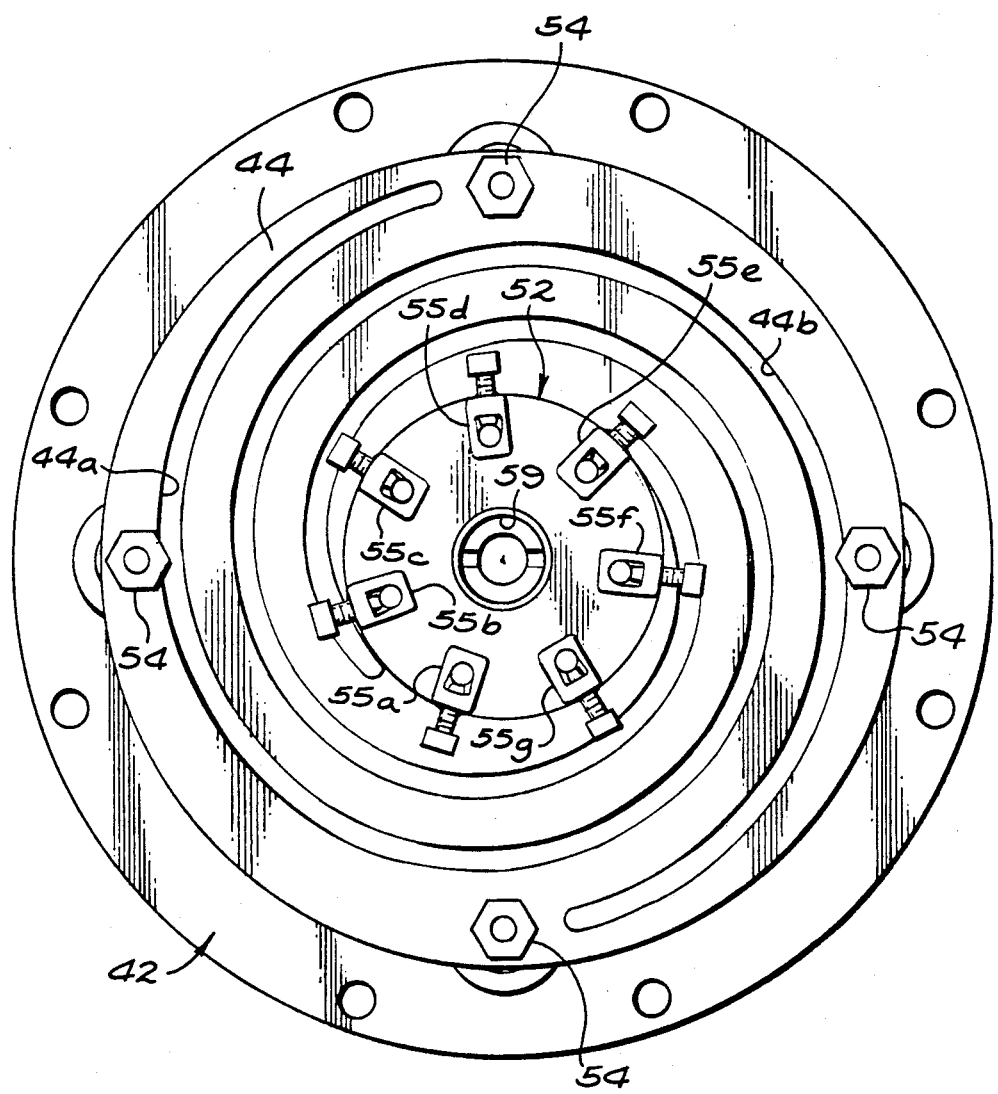
FIG. 3 is a plan view of the adjustable range spring assembly of FIG. 2 showing the flat dual spiral spring member and clamp disc used therein.
Figure 4:
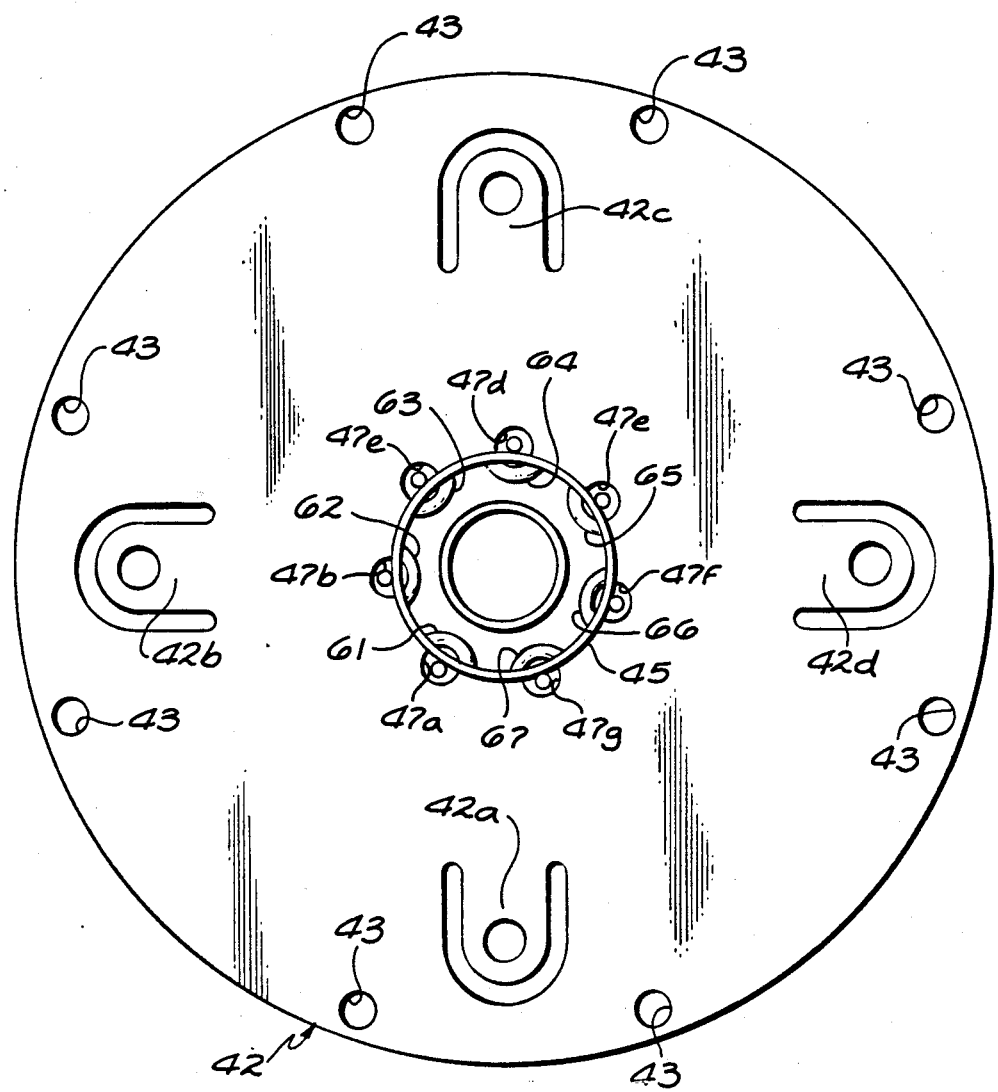
FIG. 4 is a plan view of the opposite side of the adjustable range spring assembly of FIG. 2 showing the spring retainer plate member used therein.

By reference to FIGS. 2 through 4, there is shown in FIG. 2, an adjustable range spring assembly 40, the components of which include a spring retainer plate member 42 (See also FIG. 4), a disc-shaped flat dual spiral spring member 44 (See also FIG. 3), a plurality of helical range springs 61–67, a spring end clamp disc 52 and other components such as standoffs and fastening hardware. The spring retainer plate member 42 and the spiral spring member 44 are circular in plan elevation, with the diameter of the retainer plate member 42 being slightly larger than the diameter of the spiral spring member 44. In the illustrated embodiment, each of the helical range springs 61–67 is identical, although they need not be. The clamp disc 52 is likewise generally disc-shaped. As will become apparent, the adjustable range spring assembly 40 may be readily interchanged with the convention fixed range differential spring assembly 30 of FIG. 1.

Briefly, the adjustable range spring assembly 40 includes the metallic spring retainer plate member 42 which, like the plate member 31 of assembly 30, is assembled within the chamber 11a of housing 12a in fixed relation thereto, and is provided with a dish-shaped contour to accommodate the attachment of components thereto within the dimensions of the chamber 11a. The retainer plate member 42, however, is provided with integrally formed apertured lug portions 42a-42d, which may be formed by die cutting of the retainer plate member during shaping. After shaping, the lug portions 42a-42d lie in a common plane, and are equiangularly disposed about the center of the plate member 42. The flat spiral spring member 44 is maintained in generally parallel spaced relation to the plane of the lug portions 42a-42d by interconnecting spacer members 53 (only two of which are shown) and fasteners 54. The peripheral flange portion of the spring retainer plate member 42 is provided with a plurality of apertures 43 for attachment to the standoffs 33 within chamber 11a (See FIG. 1). The central portion of the retainer plate member 42 is configured as an opening surrounded by a hub 45, with a plurality of equiangularly positioned apertures 47a-47g thereabout in proximate relation to the flanged hub 45.

As shown in FIG. 3, the spiral spring member 44 is generally disc-shaped with first and second interleaved spiral grooves 44a and 44b formed therein commencing form the outer edge and terminating a fixed distance form the center thereof to form an uninterrupted centermost portion, with the outer peripheral portion having apertures therein for connection to the fasteners 54. The uninterrupted central portion is of sufficient diameter to receive thereon the clamp disc 52 which is suitably fastened to the spiral spring member 44 in concentric relation. Suitably bonded to the surface of the clamp disc 52 are a plurality of equiangularly disposed clamping devices 55a-55g, each of which is formed as a stud projection with an opening extending therethrough in a direction perpendicular to the plane of the disc 52, with each projection having a laterally extending threaded aperture for receiving therein a lock screw (See FIG. 2). The openings of each of the clamping devices 55a-55g is in axial alignment with a corresponding one of the apertures 47a-47g in the spring retainer plate member 42.

A plurality of helical springs 61-67 are provided, with each of the helical springs 61-67 being dimensionally identical and having the opposite ends thereof centrally located, oppositely directed, and in axial alignment (See, for example, ends 63a and 63b of spring 63 in FIG. 2). The range spring array is geometrically arranged for coaction with the operative uninterrupted centermost portion of the flat dual spiral spring member 44, and, as shown, the preferred geometric arrangement is a circular configuration of seven helical springs 61-67 disposed in equiangular generally parallel relation about an axis extending through the centers of the spring retainer plate member 42 and the flat spiral spring 44, this being the axis of movement of the valve stem 20. Each of the springs 61-67 has the first end thereof, for example end 63a, shorter than the other end, such as end 63b of spring 63. The first ends, such as end 63a of each of the helical springs 61-67 is suitably secured relative to the spring retainer plate member 42, such as by passing the ends through the apertures 47a-47g and brazing or welding the short ends to the hub 45. The longer ends, such as end 63b, of the springs 61-67 are passed through the openings of the clamping devices 55a-55g, respectively, on clamping disc 44. Each of the openings of the clamping devices 55a-55g is slightly larger than the diameter of the spring end, and may be, for example, a triangularly configured opening slightly larger than the diameter of the end 63a to facilitate attachment of the spring end, such as end 63a within the opening upon tightening of the locating screw associated with the clamping device.

For enabling attachment of the adjustable range spring assembly 40 within chamber 11a, the central portion of clamp disc 52 is provided with an aperture 59, through which the threaded end 20a of valve stem 20 is passed with a suitable nut attached thereto, for enabling securing the clamp disc 52 for movement with the valve stem 20 with the periphery of the spring retainer plate member 42 secured to the spacers or standoffs 33.

With the construction thus described, one end 63a of each helical coil spring 61-67 is welded to an inside diameter of the spring retainer plate member 42. The flat spiral spring 44, the clamp disc 52 and the clamping devices are mounted to an outside diameter of the spring retainer plate member 42. In this manner, the flat spiral spring 44 has an added function of maintaining a straight line motion of the bellows 16 when the initial helical coil spring is locked in position. This is because of off-center position of the helical coil spring. The long ends the helical springs 61-67 are loosely constrained in triangular shaped holes in the clamping devices 55a-55g which are secured to the clamp disc 52. The lock screws are perpendicular to the long ends of the helical coil springs 61-67.

In operation, with different pressure devices 10, for a first range, all of the long ends of the helical springs 61-67 are loosely positioned within the respective openings of the clamping devices 55a-55g, that is, none of the lock screws are tightened. In this range, the bellows 16 and 18, the torque tube 24 with its arm 26 and the flat spiral spring member 44 make up the initial differential pressure range, which may be, for example, a range of 0-25" W.C. (inches of Water Column). Thereafter, again by way of example, with each helical spring 61-67 being identical in all respects, for each additional spring locked into place relative to the clamp disc 52, an additional unit of range will be added to the assembly 40. For example, each helical spring 61-67 locked relative to the clamp disc 52 (and correspondingly the flat spring member 44) may produce 0-50", 0-75" W.C. etc. up to 0-200" W.C. plus.

In accordance with the present invention, the adjustable range spring assembly 40 provides a method of utilizing a single prefabricated assembly, which may be individually adjusted to one of a plurality of ranges for use within a differential pressure responsive device, within the limits of the bias of each helical spring as well as the number os such springs, any one or more of which may be selectively and sequentially placed in operative relation to bias the device as required. It is also to be understood that the springs 61-67 may be linear or non-linear and need not be identical in spring force, although it is preferred that they be identical. It is further to be understood that, although the invention has been described as being useful in differential pressure responsive devices, it is, however, not restricted to these devices and may be used wherever a change in range and/or force is applicable in any device requiring such changes.

While there has been shown and described a preferred embodiment, it is to be understood that various other adaptations and modifications may be made within the spirit and scope of the invention.

What is claimed is:

1. In a device having a housing means with an element therein movable in response to a sensed condition, an adjustable range spring assembly comprising:
   retainer plate means for attachment in fixed relation to said housing means;
   flat spring means mounted in spaced relation to said retainer plate means and being coupled to said element for providing an initial biasing force on said element;
   a plurality of other spring means, each of said other spring means having first and second ends;
   means for securing the first ends of said other spring means to one of said retainer plate means and said flat spring means; and
   means on the other of said retainer plate means and said flat spring means for enabling selective attachment of the second ends of said other spring means for enabling adjustment of the biasing force on said element above said initial biasing force, wherein said flat spring means is a coplanar flat spiral spring member, directly mounted by a plurality of peripheral fasteners to said retaining plate means with spacer means to maintain said retainer plate means in spaced relation to the directly adjacent flat spring means, and said other spring means includes a plurality of helical springs with the first and second ends thereof in axial alignment, and said means on the other of said retainer plate means and said flat spiral spring member for enabling selective attachment includes a clamping device for each of said helical springs.

2. A differential pressure responsive device comprising:
   housing means;
   pressure responsive means within said housing means;
   an element within said housing means movable in response to pressure conditions sensed by said pressure responsive means;
   retainer plate means for attachment in fixed relation to said housing means;
   flat spring means mounted in spaced relation to said retainer plate means and being coupled to said element for providing an initial biasing force on said element;
   a plurality of other spring means, each of said other spring means having first and second ends;
   means for securing the first ends of said other spring means to one of said retainer plate means and said flat spring means;
   means on the other of said retainer plate means and said flat spring means for enabling selective attachment of the second ends of said other spring means for enabling adjustment of the biasing force on said element above said initial biasing force whereby to enable selective adjustment of the pressure range of said device;
   said flat spring means is a coplanar flat spiral spring member, directly mounted by peripheral fastening means to said retaining plate means including spacer means to maintain said retaining plate means in space relation to the directly adjacent flat spring means.

3. The device according to claim 2 wherein said other spring means are helical springs.

4. The device according to claim 2 wherein said other spring means includes a plurality of helical springs with the first and second ends thereof in axial alignment, and said means on the other of said retainer plate means and said flat spring means for enabling selective attachment includes a clamping device for each of said helical springs.

5. A method for enabling adjustment of the range of operation of a differential pressure responsive device having a housing means with an element therein movable in response to a sensed condition, said method comprising:
   providing retainer plate means for attachment in fixed relation to said housing means;
   providing a coplanar flat spiral spring member mounted in spaced relation directly to said retainer plate means by a plurality of peripheral fasteners and being coupled to said element for providing an initial biasing force on said element;
   providing spacer means for maintaining said retainer plate means in spaced relation to the directly adjacent flat spiral spring member;
   providing a plurality of helical spring means, each having first and second ends;
   securing the first ends of said helical spring means to one of said retainer plate means and said flat spiral spring member;
   providing means on the other of said retainer plate means and said flat spiral spring member for enabling selective clamping of the second ends of said helical spring means; and
   clamping selected ones of said second ends for adjusting the biasing force on said element to include said flat spring means and the selected one of said helical spring means.

6. An adjustable range spring assembly for use in a differential pressure responsive device having housing means with pressure responsive means within said housing means and an element within said housing means operable in response to pressure conditions sensed by said pressure responsive means, said assembly comprising in combination:
   retainer plate means for attachment in fixed relation to said housing means;
   coplanar flat spiral spring means directly mounted by peripheral fastening means in generally spaced relation to said retainer plate means, said flat spiral spring means being coupled to said element for providing a biasing force on said element for enabling at least partial establishment of a pressure range for said device;
   spacer means maintaining said retainer plate means in spaced relation to the directly adjacent flat spring means;
   a plurality of helical spring means, each of said helical spring means having first and second ends;
   means for securing the first end of said helical spring means to one of said retainer plate means and said flat spring means;
   means on the other of said retainer plate means and said flat spring means for enabling attachment of the second end of selected ones of said helical spring means for enabling adjustment of the biasing force on said element whereby to selectively adjust the pressure range of said device;

said helical spring means have the first and second ends thereof in axial alignment, and said means on the other of said retainer plate means and said flat spring means for enabling selective attachment includes a clamping device for each of said helical springs; and said retainer plate means has a generally circular shape in plan elevation with a central hub portion, wherein said flat spring means is generally disc-shaped, and wherein said first ends are secured adjacent said hub portion and said spacer means maintaining said retainer plate means in spaced relation to said flat spring means is positioned adjacent the periphery of said retainer plate means and said flat spring means.

7. The assembly according to claim 6 wherein said retainer plate means is metallic, and said first ends are secured thereto by welding.

8. The assembly according to claim 7 wherein said element is coupled to said flat spring means generally at the center thereof and each of said clamping devices includes a projection with an opening for receiving therein one of said second ends and a lock screw threadably engaging an aperture in said projection transverse to said opening.

9. In a device having a housing means with an element therein movable in response to a sensed condition, an adjustable range spring assembly comprising:

a metallic retainer plate member for attachment in fixed relation to said housing means, said retainer plate member being generally circular in plan elevation and having a centrally positioned hub portion;

a generally disc-shaped flat spring member mounted in spaced relation to said retainer plate means by spacer means adjacent the perimeter thereof and being coupled to said element for providing an initial biasing force on said element;

a plurality of other spring means, each of said other spring means having the first ends thereof welded to said retainer plate member adjacent said hub portion;

clamp disc means on said flat spring member and having a plurality of clamping devices for enabling selective attachment of the other ends of said other spring means for enabling adjustment of the biasing force on said element above said initial biasing force, wherein said flat spring member is a coplanar flat spiral spring member directly mounted by peripheral fastening means to said retaining means wherein said spacer means maintains said retaining plate means in spaced relation to the directly adjacent flat spring means; and said other spring means are helical springs with the opposite ends thereof in axial alignment, and said clamping devices include means for receiving said other ends therein and means for selectively clamping said other ends, wherein the axes and of said helical springs are generally parallel to one another.

* * * * *